Figure 1:
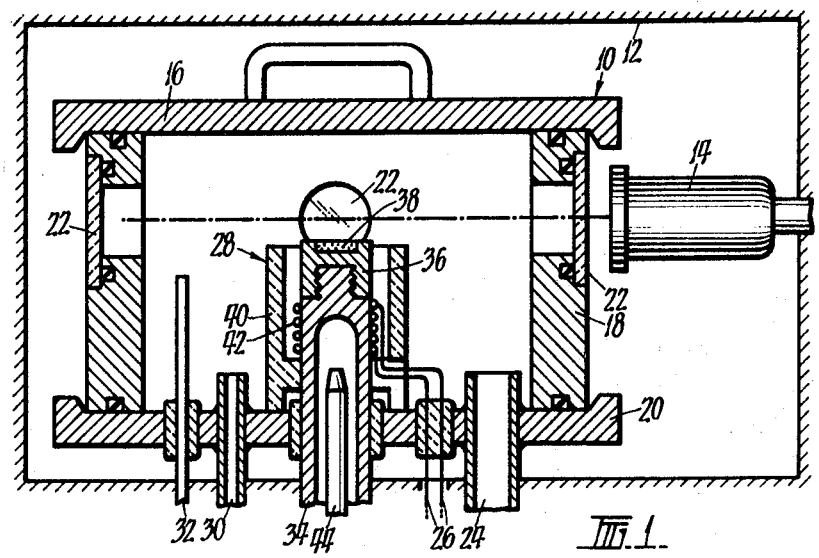

United States Patent

Walsh

[15] 3,644,045
[45] Feb. 22, 1972

[54] ATOMIC ABSORPTION SPECTROSCOPY

[72] Inventor: Alan Walsh, Brighton, Victoria, Australia
[73] Assignee: Commonwealth Scientific and Industrial Research Organization, Victoria, Australia
[22] Filed: May 1, 1969
[21] Appl. No.: 821,008

[30] Foreign Application Priority Data

May 1, 1968 Australia ..................37184/68

[52] U.S. Cl. ....................356/85, 250/43.5 R, 250/83.3 UV, 356/97
[51] Int. Cl. ..............................................G01j 3/42
[58] Field of Search....................................313/209; 356/85–87, 96–98; 250/43.5 R, 83.3 UV

[56] References Cited

UNITED STATES PATENTS

| | | | |
|---|---|---|---|
| 3,137,758 | 6/1964 | Mason et al. | 356/95 |
| 2,847,899 | 8/1958 | Walsh | 356/95 |
| 3,544,789 | 12/1970 | Weider | 250/43.5 |

OTHER PUBLICATIONS

Gatehouse et al.: Spectrochimica Acta, vol. 16, 1960 pages 602–604
Goleb et al.: Analytica Chemica Acta, vol. 28, May 1963 pages 457–466
Sullivan et al.: Spectrochimica Acta, vol. 21, Apr. 1965, pages 727–730
Bowman et al.: Spectrochimica Acta, vol. 22 Feb. 1966, pages 205–210
Neu et al. Messtechnik, July 1968, pages 154–159.

Primary Examiner—Ronald L. Wibert
Assistant Examiner—F. L. Evans
Attorney—Sughrue, Rothwell, Mion, Zinn & MacPeak

[57] ABSTRACT

Method and apparatus for atomic absorption spectroscopic analysis, particularly of a solid sample substance, by sputtering the sample to produce an atomic vapor, illuminating the vapor with spectral radiation including the spectrum of an element to be determined and using a photodetector to measure the quantity of resonance radiation emitted by the vapor as a measure of the quantity of the element in the sample, with or without the use of modulation techniques to obtain usable signal to noise ratios in the detector output.

20 Claims, 4 Drawing Figures

ATOMIC ABSORPTION SPECTROSCOPY

This invention is concerned with atomic absorption spectroscopy and seeks to provide a direct and simple technique whereby a sample can be analyzed without the need for it to be first taken into solution and then sprayed into an atomizing flame. The techniques of the present invention are particularly suitable for the direct analysis of metals, alloys and other electrically conducting sample substances.

Basically, the technique of the present invention involves forming an atomic vapor of the substance to be analyzed by means of a discharge which causes sputtering of a sample of the substance illuminating the vapor by radiation including the spectrum of an element to be determined, and determining the intensity of resonance radiation emitted by the vapor as a measure of the amount of the element present in the substance.

It is preferable, in accordance with the invention, to employ modulation techniques to distinguish the signal due to resonance radiation from those due to self excitation of the sputtering discharge and/or from those due to after-glow from the discharge. The signal-to-noise ratio may be further enhanced if desired by employing broadband long wavelength absorption filters in conjunction with photomultipliers which have a peak sensitivity at short wavelengths, since it is in the latter region of the spectrum that the main resonance lines of many metals lie.

From another aspect, the invention may be said to include apparatus for atomic absorption analysis comprising, a vacuum chamber, mans within the chamber for mounting the sample and for carrying a discharge to cause sputtering thereof, an atomic spectral lamp arranged to illuminate vapor generated by said sputtering, a photodetector arranged to receive resonance radiation from the vapor and to produce an electrical output signal, and means connected to the photodetector to selectively block portions of the output signal.

Preferably, the sample to be analyzed is subjected to the usual processing cleaning techniques appropriate to electrodes for use in electric discharge tubes. The vacuum chamber is preferably filled with a rare gas at low pressure and arrangements may be made to circulate the gas and clean it. The vacuum chamber may contain an anode electrode so that the discharge can be struck in said gas between the anode and the sample substance which serves as cathode. In order to avoid detection of radiation emitted directly from the atomic spectral lamp, the photodetector should be arranged so as to receive radiation from a different direction to that in which the lamp transmits.

According to another optional feature, the sample to be analyzed is secured to a force-cooled projection within the vacuum chamber so that the temperature of the sample may be controlled during the analysis; and, for this purpose, temperature sensing means may be attached to the projection. In order to confine the discharge to the sample, a tubular sleeve of insulating material is preferably placed around the projection and spaced a small distance therefrom.

Figure 2:
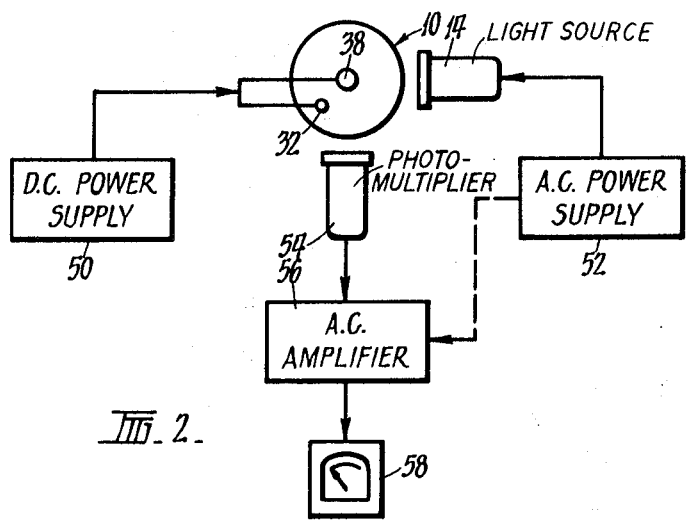
Figure 3:
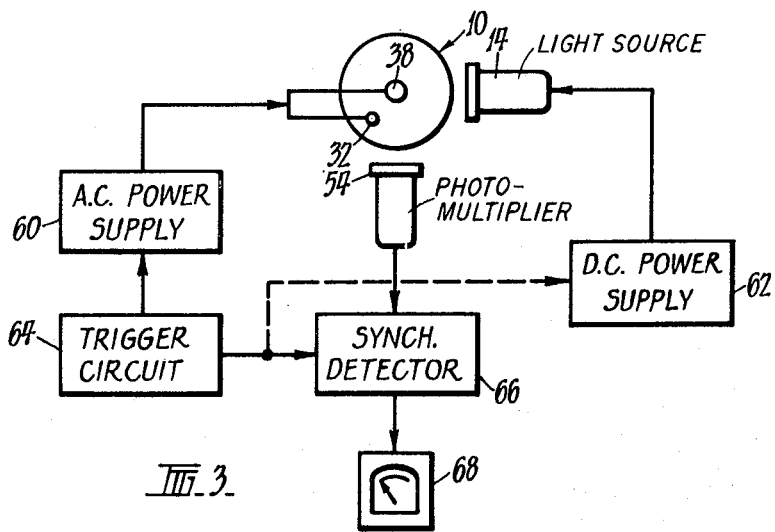
Figure 4:
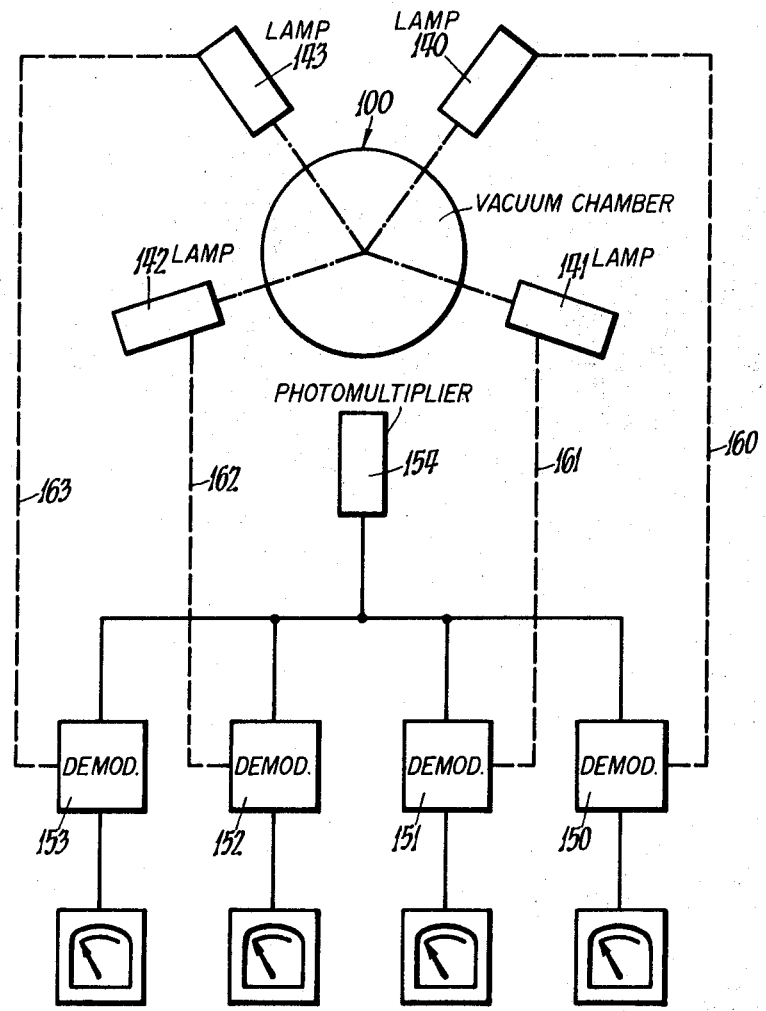

In order to further portray the nature of the present invention, particular embodiments thereof will now be described by way of example and illustration only. In the following description reference will be made to the accompanying drawings, in which:

FIG. 1 is a semidiagrammatic elevation of a specimen chamber suitable for use in the systems of FIGS. 2 and 3, FIG. 2 is a block diagram of the components of one system embodying the present invention and employing simple modulation techniques, FIG. 3 is a block diagram of a more complex system than that shown in FIG. 2, and FIG. 4 is a diagram of the layout of a system employing a plurality of lamps for determination of a corresponding number of elements.

Referring now to FIG. 1 of the drawings in particular, the sample chamber 10 is housed within a lighttight enclosure 12 together with the atomic spectral lamp 14 and the photomultiplier (not shown) which, in this case, is mounted in the same horizontal plane as the lamp 14 but is disposed at right angles thereto. Chamber 10 consists of a top plate 16, a cylindrical body 18 and a baseplate 20 which are formed from a metal such as stainless steel and rest one upon the other and are sealed in a vacuumtight manner by suitable O-rings The body 18 has two pairs of diametrically opposed windows 22 sealed in apertures formed in its upper periphery, the lamp 14 being arranged in line with one pair while photomultiplier is arranged in line with the other. If desired, the windows adjacent the lamp and/or the photomultiplier may be coated or fitted with a broad band long wavelength filter material.

Baseplate 20 mounts: an exhaust pipe 24 through which the chamber 10 may be evacuated by means of a vacuum pump (not shown) connected thereto; a pair of thermometer leads 26 which are sealed therein by means of an insulating ceramic or glass seal; a sample mount assembly 28; a gas inlet pipe 30; and, an anode electrode wire 32 which is sealed into the plate 20 but insulated therefrom. The sample mount assembly 28 includes: a hollow sample mounting stud 34 (formed of copper, for example) which is sealed into but insulated from the baseplate 20 so that its lower and open end is accessible from below the baseplate; a sample button 36 which is threaded internally so as to screw onto the stud 34 as shown and incorporates an uppermost recess within which a sample powder or pellet 38 may be pressed; and an insulating cylindrical sleeve 40 which fits concentrically about stud 34 and rests on baseplate 20. Near the upper threaded portion of the stud 34, a resistance thermometer or thermocouple 42 is wound and its leads are connected to the terminals 26. A water cooling jet tube 44 is located concentrically with the hollow base of the stud 34 so as to be able to project a cooling jet of water onto the interior walls thereof.

In operation, a sample pellet is pressed into the button 36 by means of a suitable press located externally to the chamber 10, and the button is screwed onto stud 34 after the top plate 16 has been removed. The top plate is then replaced and the chamber evacuated via pipe 24 until the desired pressure has been reached, whereupon, a rare gas such as argon is admitted via pipe 30 to furnish the working pressure and atmosphere. A gaseous discharge is then struck between the sample pellet as cathode and anode 32, the cathode connection being made to the base of stud 34. After sufficient sputtering of the sample has taken place to thoroughly clean its surface, the flow of cooling water from pipe 44 is adjusted so as to maintain the sample at a predetermined temperature as indicated by the resistance thermometer or thermocouple 42. The vapor generated in the immediate vicinity of the sample pellet is then illuminated by radiation from lap 14 characteristic of the element for which the analysis is being performed, and the resonance radiation is detected by the photomultiplier Referring now to FIG. 2, the simplest system—which is suitable where the element being determined is present within the sample in a few percent—is that where the sputtering discharge between the sample 38 and the anode 32 is generated by direct current from a DC power supply 50 and the spectral lamp 14 is supplied from an AC supply 52, the output signal from the photomultiplier 54 being amplified by an AC amplifier 56 before being fed to an indicator or output circuit 58. However, even where the concentration of the determined element in the sample is of the order of a few percent, it may be found that the intensity of the pulsating illumination is insufficient to provide adequate discrimination over the emission from the discharge for certain elements. Some improvement can be obtained through operating amplifier 56 as a synchronous demodulator controlled in phase with the AC supply 52—as indicated by the dotted line—but where such improvement is marginal, the system of FIG. 3 is preferred.

In FIG. 3, lamp 14 again irradiates the vapor produced by the discharge between anode 32 and sample 38 within chamber 10, and the photomultiplier 54 may still be directed at the vapor in the same way; but, in this case, the discharge is pulsatory being supplied by an AC power supply 60, and the illuminating spectral radiation is made constant, the lamp being supplied by a DC supply 62.

The timing of the pulses from supply 60 is determined by a timing or trigger circuit 64 which also controls a synchronous detector—or gating—circuit 66 so that the signal from tube 54 is blocked during each discharge pulse and passed to the output circuit 68 only between pulses.

The above described system may be modified by further controlling the circuit 66 so that the signal is passed only for a brief period (relative to the discharge cycle) following the termination of the discharge pulse. Preferably, this gated period is delayed somewhat until the afterglow of the vapor has died down sufficiently to give optimum signal to noise ratios. Thus, the signal from the vapor may be detected for a short period during which it remains substantially constant and when the after glow is not examined.

It will be noted from the above description with respect to FIG. 3 that, if desired, the power supply 62 to the lamp 14 may be pulsed in synchronism with the gating of the signal by circuit 66; and this has been found to offer some advantages in terms of signal-to-noise ratio. (Such operation is indicated by the broken line in FIG. 3.) An extension of this technique envisaged by the invention is one where the controlling circuit delivers control pulses at a greater rate to the power supply 62 and the gate 66 than to the power supply 60 so that the circuit 66 is rendered ineffective—as before—during the discharge pulse and so that, in addition, it is made to discriminate in favor of a signal at the frequency at which the light source 14 is pulsed.

FIG. 4 illustrates a further embodiment of the present invention which enables simultaneous or very rapid analysis for a number of elements—four in the illustration. Numeral 100 indicates a vacuum chamber similar to the vacuum chamber 10 but provided with five windows (not indicated) enabling entry of radiation from each of four atomic spectral lamps 140 to 143 respectively, and exit of resonance radiation to a photomultiplier 154. The photomultiplier is again of the type having peak sensitivity at or near the ultraviolet end of the electromagnetic spectrum and the window associated with the photomultiplier is provided with a broad band or absorption filter which is effective at long wavelengths. Similar filters may be provided on the other windows.

The chamber is again provided with means to sputter a sample at or about the center thereof to produce an atomic vapor, and the lines of radiation from the lamps 140 to 143 converge upon the region at which vapor will be produced. Photomultiplier 154 is arranged to face this region and is also located so as to be out of alignment with each of the lamps 140 to 143.

Lamps 140 to 143 are arranged to emit radiation including spectra of respective elements to be determined. If it is desired to examine a sample simultaneously for each of these elements, the apparatus can be provided with four synchronous demodulators 150 to 153 respectively the demodulators feeding respective meters indicated in the figure. Such apparatus is provided with a power supply (not shown) by means of which the currents fed to lamps 140-143 are varied, the variation in the supply current being different for each of the lamps. As indicated by the dotted line 160 to 163 respectively, the lamps are associated with respective synchronous demodulators, and the demodulators are controlled to operate in synchronism with their respective lamps. Accordingly, the demodulators separate the components in the radiation detected by the photomultiplier 154 corresponding with the radiation emitted by the various lamps corresponding indications are given on the various meters.

It it is not desired that a sample be examined simultaneously for all elements, a single demodulator may be used in association with the photomultiplier 154, and the lamps may be powered by a power supply which varies current supply to the lamps at a single frequency. In this case however, the lamps must be controlled to operate successively on a time sharing basis so that successive indications are given as to the quantity of each of the four elements to be determined.

While particular examples of the application of the principles of the present invention have been described, it will be appreciated that many modifications are possible without departing from the scope of the present invention. Similarly, other apparatus and techniques may be employed which utilize the principles indicated. For example, the manner in which the sample is prepared and mounted may vary widely, since wire cathodes are both convenient and effective. While it is not thought to be particularly desirable, the cathode may be made hollow so as to give rise to hollow cathode emission during the discharge pulses and so as to concentrate the vapor more effectively. Various alternative procedures and techniques for processing the photodetector signals may be employed for particular effects or sample substances. As indicated above, the photomultipliers are preferably of the type having peak sensitivity to radiation at short wavelengths, near the ultraviolet region of the spectrum. The gas inlet 30 and outlet 24 may be connected to a gas circulating system permitting cleaning and reuse of gas, for instance, if xenon is to be used. If argon is to be used, however, inlet 30 may simply be connected to a suitable source of the gas and outlet 24 may be exhausted to atmosphere.

I claim:

1. A method of atomic absorption spectroscopy comprising the steps of creating a pulsed discharge between an electrode and a sample of a substance to be analyzed so that an atomic vapor of the substance is formed by sputtering during the discharge pulses, and a cloud of the vapor is produced under conditions such that if the sample contains an element to be determined the vapor in the cloud can absorb and reemit resonance radiation characteristic of the element, illuminating the cloud with illuminating radiation comprising a resonance line characteristic of said element, determining the intensity of resonance radiation characteristic of said element reemitted by the cloud in periods between discharge pulses in a direction such that the reemitted radiation is not mingled with illuminating radiation, and using the determined intensity as a measure of the concentration of the element present in the sample.

2. A method as claimed in claim 1 comprising the steps of modulating said resonance line of the illuminating radiation and determining the intensity of similarly modulated resonance radiation reemitted by the cloud.

3. A method as claimed in claim 2 wherein said resonance line is one of a plurality of resonance lines in the illuminating radiation, said plurality of resonance lines being respectively characteristic of a plurality of elements to be determined, the method including the steps of modulating said resonance lines in respective distinctive manners, and determining the intensity of resonance radiation reemitted by the cloud and modulated in any one of said distinctive manners.

4. Apparatus for use in atomic absorption spectroscopic analysis comprising a vacuum chamber, means for mounting a sample of a substance within the chamber, means for creating a pulsed discharge to cause sputtering of the sample so that an atomic vapor of the substance is produced in the chamber, means for illuminating said vapor with illuminating radiation comprising a resonance line characteristic of an element to be determined, photodetecting indicator means arranged to receive resonance radiation reemitted by said vapor in a direction such that illuminating radiation is not received and to indicate the concentration of said element in the sample in response to received resonance radiation, and means to render the photodetecting indicator means ineffective during each discharge pulse.

5. Apparatus as claimed in claim 4 comprising means to modulate said resonance line of the illuminating radiation, the photodetecting indicator means being responsive to similarly modulated resonance radiation reemitted by the vapor.

6. Apparatus as claimed in claim 5, wherein said resonance line is one of a plurality of resonance lines being respectively characteristic of a plurality of elements and means for modulating said plurality of lines in respective distinctive manners, and the photodetecting indicator means being responsive to resonance radiation reemitted by the vapor and modulated in any of said distinctive manners so that said plurality of elements can be determined simultaneously.

7. Apparatus as claimed in claim 6 wherein the means for illuminating the vapor comprises a plurality of sources arranged to produce respective resonance lines modulated in respective distinctive manners, and the photodetecting indicator means comprises a photodetector arranged to supply a signal representing received radiation to a plurality of indicator means selects from said signal a component representing resonance radiation modulated in a similar manner to the resonance line emitted by its respective source.

8 Apparatus for use in atomic absorption spectroscopic analysis comprising wall means defining a sealable chamber, a projection extending from the wall means into the chamber and arranged to receive a sample of a solid substance at a location spaced from the wall means, an electrode within said chamber enabling application of an electrical potential difference between the electrode and the sample so that a discharge can be created between them to cause sputtering of the sample thereby to create in the region of said location a cloud of atomic vapor of the sample under such conditions that if the sample contains a particular element the cloud will absorb and reemit resonance radiation characteristic of that element, a pair of windows in said wall means facing each other from opposite sides of said region, an atomic spectral lamp located outside the chamber for producing resonance line radiation characteristic of said particular element to illuminate said cloud with a beam of radiation which enters the chamber by way of one window of the pair and leaves by way of the other, and a further window in the wall means so located relative to said pair of windows that in use the beam does not impinge on it but resonance line radiation absorbed and reemitted by the cloud is permitted to leave the chamber via said further window to be received by photodetector means responsive thereto and located outside the chamber.

9. Apparatus as claimed in claim 8 and further including energizing means for generating said electrical potential difference such that in use a pulsating discharge is produced, and means to render the photodetector means ineffective during each discharge pulse.

10. Apparatus as claimed in claim 8 and further comprising gas inlet means and outlet means extending through said wall means to permit forced circulation of rare gas through the chamber in use.

11. Apparatus as claimed in claim 8 and further comprising a sleeve of insulating material located around the projection but spaced therefrom and operative to localize the discharge on the sample.

12. Apparatus as claimed in claim 8 wherein the photodetector means comprises a photomultiplier having peak sensitivity to radiation near the ultraviolet region of the spectrum.

13. Apparatus as claimed in claim 8 wherein means is provided to enable force-cooling of the projection in use.

14. Apparatus as claimed in claim 13 wherein the projection is hollow and extends through the wall means, and said means to enable force-cooling is located within the hollow projection.

15. Apparatus as claimed in claim 8 wherein said resonance line is one of a plurality of resonance lines in the illuminating radiation, the plurality of resonance lines being respectively characteristic of a plurality of elements and being modulated in respective distinctive manners, and the photodetector means being responsive to resonance radiation reemitted by the vapor and modulated in any of said distinctive manners so that said plurality of elements can be determined simultaneously.

16. Apparatus for use in atomic absorption spectrophotometric analysis of a sample for a plurality of atomic species comprising
    means for creating a cloud of atomic vapor from the sample under such conditions that if the sample contains any one of said species the cloud can absorb and reemit resonance radiation characteristic of that species against a background of emissive radiation at wavelengths other than that of the resonance radiation,
    means to generate illuminating radiation to illuminate the cloud and containing a plurality of resonance lines respectively characteristic of said plurality of species and modulated in respective distinctive manners,
    photodetector means having peak sensitivity in the ultraviolet region of the electromagnetic spectrum and arranged to receive, and produce an output signal representative of, resonance radiation reemitted by the cloud in a direction such that none of said illuminating radiation is received directly,
    and demodulator means responsive to the output signal and arranged to select therefrom components modulated in any of said distinctive manners and respectively representative of the concentrations in the sample of the species represented by the corresponding modulated resonance lines in the illuminating radiation.

17. Apparatus as claimed in claim 16 wherein the means to generate the illuminating radiation comprises a plurality of sources of radiation arranged to generate respective ones of said resonance lines and to illuminate the cloud in a predetermined sequence, the demodulator means being arranged to switch the output signal of the photodetector means between a plurality of output means in a corresponding sequence so that said components are received by respective ones of said output means.

18. Apparatus as claimed in claim 17 wherein the resonance lines are additionally amplitude modulated at a preset frequency, and the demodulator means is selectively responsive to that frequency.

19. Apparatus as claimed in claim 16 wherein the means to generate the illuminating radiation is arranged to modulate said resonance lines at respective distinctive frequencies and the demodulator means comprises a plurality of demodulator output means selectively responsive to respective ones of said frequencies.

20. A method of atomic absorption spectrophotometric analysis of a sample for a plurality of atomic species comprising the steps of forming from the sample a cloud of atomic vapor under such conditions that if the sample contains any one of said species the cloud can absorb and reemit resonance radiation characteristic of that species against a background of emissive radiation at wavelengths other than that of the resonance radiation, illuminating the cloud with a plurality of resonance lines respectively characteristic of said species and modulated in respective distinctive manners, detecting resonance radiation reemitted by the cloud in a direction such that none of said illuminating radiation is received directly with photodetector means having peak sensitivity in the ultraviolet region of the electromagnetic spectrum and generating an output in response to the detected resonance radiation, and demodulating the output signal to provide a plurality of output components modulated any of said respective distinctive manners and respectively representative of the concentrations in the sample of the species represented by the correspondingly modulated resonance lines in the illuminating radiation.

\* \* \* \* \*